US012749634B2

(12) United States Patent
Hammer et al.

(10) Patent No.: US 12,749,634 B2
(45) Date of Patent: Sep. 29, 2026

(54) ON-LOAD TAP CHANGER AND TAP-CHANGING TRANSFORMER HAVING AN ON-LOAD TAP CHANGER

(71) Applicant: MASCHINENFABRIK REINHAUSEN GMBH, Regensburg (DE)

(72) Inventors: Christian Hammer, Regensburg (DE); Wolfgang Albrecht, Wenzenbach (DE); Michael Schmeisser, Regensburg (DE); Christian Kotz, Schorndorf (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 831 days.

(21) Appl. No.: 18/042,302

(22) PCT Filed: Jul. 21, 2021

(86) PCT No.: PCT/EP2021/070382
§ 371 (c)(1),
(2) Date: Feb. 21, 2023

(87) PCT Pub. No.: WO2022/042955
PCT Pub. Date: Mar. 3, 2022

(65) Prior Publication Data

US 2024/0029965 A1 Jan. 25, 2024

(30) Foreign Application Priority Data

Aug. 27, 2020 (DE) ..................... 10 2020 122 444.3

(51) Int. Cl.
*H01F 27/28* (2006.01)
*H01F 29/02* (2006.01)
(Continued)

(52) U.S. Cl.
CPC ......... *H01H 9/0016* (2013.01); *H01F 29/025* (2013.01); *H01F 29/04* (2013.01); *H01H 9/0027* (2013.01)

(58) Field of Classification Search
CPC .... H01F 27/292; H01F 5/04; H01F 2017/048; H01F 17/0013; H01F 27/2804;
(Continued)

(56) References Cited

U.S. PATENT DOCUMENTS 4,532,386 A * 7/1985 Muench, Jr. ......... H01H 9/0011 200/336
5,847,939 A * 12/1998 Cotton .................. H01H 33/68 361/836
(Continued)

FOREIGN PATENT DOCUMENTS

CN 102169748 A 8/2011
CN 105977002 A 9/2016
(Continued)

*Primary Examiner* — Shawki S Ismail
*Assistant Examiner* — Kazi S Hossain
(74) *Attorney, Agent, or Firm* — LEYDIG, VOIT & MAYER, LTD.

(57) ABSTRACT

An on-load tap-changer provides uninterrupted diverter switch operation between different winding taps of a tap-changing transformer. The on-load tap-changer includes: a flange module; and a union nut. The on-load tap-changer is configured to be fastened to the tap-changing transformer by the union nut and the flange module.

12 Claims, 2 Drawing Sheets

(51) Int. Cl.
*H01F 29/04* (2006.01)
*H01H 9/00* (2006.01)

(58) Field of Classification Search
CPC ............. H01F 27/29; H01F 2027/2809; H01F 27/2828; H01F 17/04
USPC ................................. 336/192, 198, 200, 232
See application file for complete search history.

(56) References Cited

U.S. PATENT DOCUMENTS

| | | | |
|---|---|---|---|
| 2011/0063064 A1 | 3/2011 | Albrecht et al. | |
| 2015/0027989 A1* | 1/2015 | Bieringer ........... | H01H 33/6661 218/140 |

FOREIGN PATENT DOCUMENTS

| | | | |
|---|---|---|---|
| CN | 110556242 | A | 12/2019 |
| CN | 210200527 | U | 3/2020 |
| DE | 102008027274 | B3 | 8/2009 |
| DE | 102012103489 | A1 | 10/2013 |
| JP | 2008091393 | A | 4/2008 |
| WO | WO 2020078599 | A1 | 4/2020 |

* cited by examiner

ON-LOAD TAP CHANGER AND TAP-CHANGING TRANSFORMER HAVING AN ON-LOAD TAP CHANGER

CROSS REFERENCE TO RELATED APPLICATIONS

This application is a U.S. National Phase application under 35 U.S.C. § 371 of International Application No. PCT/EP2021/070382, filed on Jul. 21, 2021, and claims benefit to German Patent Application No. DE 10 2020 122 444.3, filed on Aug. 27, 2020. The International Application was published in German on Mar. 3, 2022 as WO 2022/042955 A1 under PCT Article 21(2).

FIELD

The present disclosure relates to an on-load tap-changer for uninterrupted diverter switch operation between different winding taps of a tap-changing transformer.

The present disclosure further relates to a tap-changing transformer having an on-load tap-changer for uninterrupted diverter switch operation between different winding taps of the tap-changing transformer.

BACKGROUND

On-load tap-changers usually have a diverter switch and a selector. The diverter switch, with vacuum interrupters and transition resistors, is arranged in a cylindrical vessel. The selector is made up of a multiplicity of bars arranged in a circle. Contacts, which serve as connections for winding taps of a tap winding, are arranged at different levels on these bars. Two selector arms are secured to a switching pillar within the selector. These selector arms make contact with the contacts on the bars. The diverter switch and selector are connected to each other via a gear mechanism.

The on-load tap-changer is fastened to the transformer cover. In the first step, the tap-changer head is screwed to the bottom side of the transformer cover. In a second step, a tap-changer cover is screwed onto the transformer cover over the tap-changer. This type of assembly is time-consuming, expensive and unsuitable for relatively small on-load tap-changers.

SUMMARY

In an embodiment, the present disclosure provides an on-load tap-changer that provides uninterrupted diverter switch operation between different winding taps of a tap-changing transformer. The on-load tap-changer includes: a flange module; and a union nut. The on-load tap-changer is configured to be fastened to the tap-changing transformer by the union nut and the flange module.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
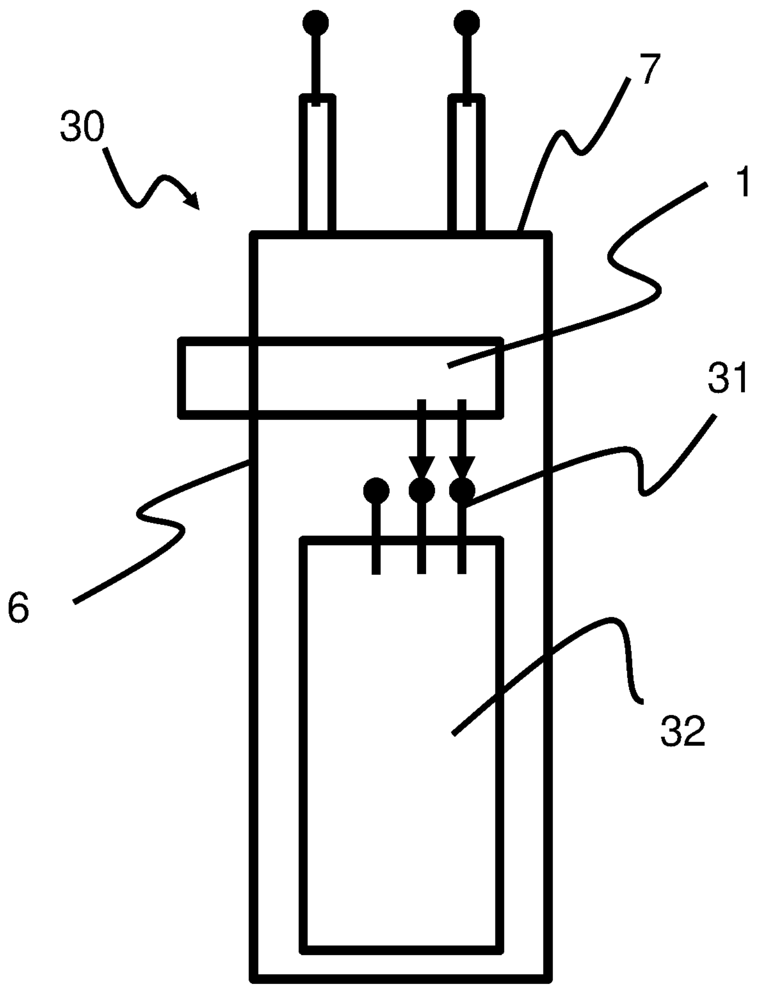
FIG. 1 shows an on-load tap-changer in a tap-changing transformer.

An aspect of the present disclosure is to provide an on-load tap-changer that is of simple and compact construction, and therefore, can be installed in a tap-changing transformer easily and in a space-saving manner.

A further aspect of the present disclosure is to provide a tap-changing transformer having an on-load tap-changer that is of a simple and compact construction.

According to a first aspect, the present disclosure provides an on-load tap changer for uninterrupted diverter switch operation between different winding taps of a tap-changing transformer, comprising a flange module and a union nut, wherein the on-load tap-changer can be fastened to the tap-changing transformer by means of the union nut and the flange module.

The assembly is particularly easy owing to the straightforward and simple solution of using a flange module and a union nut to fasten the on-load tap-changer in a tap-changing transformer. The flange module is routed from inside the tap-changing transformer through an opening in the housing wall. A part or a first region of the flange module protrudes from the housing. The union nut is fitted onto the flange module, so that the flange module is pressed from the outside against the inside of the wall of the housing.

The connection between the flange module outside the housing and the union nut can be designed in any way and can be implemented, for example, by means of a thread, partial thread, snap hooks, locking lugs or a bayonet fitting. The union nut can therefore be screwed, clipped or pushed onto the flange module. Furthermore, the connection between the union nut can be made by positive locking and/or non-positive locking.

The union nut can be designed in any way and can have, for example, an internal thread which is screwed onto an external thread of the flange module.

The flange module and/or the union nut can consist of an insulating material, preferably of plastic.

Provision can be made for at least one seal, such as a sealing ring, to be arranged between the flange module and the housing. The seal can then be arranged, for example, between the inner wall of the housing and the flange of the flange module.

The on-load tap-changer can be designed in any way and have, for example, a control unit and/or a communication unit and/or a drive and/or a diverter switch and/or a selector. The communication unit and/or the control unit can be arranged in a first region of the flange module, which region is located at least partially outside the tap-changing transformer.

The drive and/or the diverter switch and/or the selector can be arranged in a second region of the flange module, which region is arranged at least partially inside the tap-changing transformer.

Provision can be made for the diverter switch to have a plurality of semiconductor switching elements and the selector to have a plurality of mechanical switches.

Provision can be made for the first region and the second region of the flange module to be separated from one another by a wall.

The on-load tap-changer can be designed in any way and can be, for example, a conventional on-load tap-changer with mechanical contacts or a hybrid tap-changer with mechanical contacts and semiconductor switching elements.

According to a second aspect, the present disclosure provides a tap-changing transformer having an on-load tap-changer, a housing and an active part with winding taps, wherein the on-load tap-changer has a flange module and a union nut, the on-load tap-changer can be fastened to the tap-changing transformer by means of the union nut and the flange module and the on-load tap-changer is arranged above and/or next to the active part.

Because the on-load tap-changer can be fastened via the flange module and the union nut, assembly of the tap-changing transformer is particularly simple. After insertion of the active part, the on-load tap-changer can be connected to the winding taps with little effort. The flange module is then inserted through an opening in the wall of the housing up to the flange and fixed from the outside with the union nut. Special tools are not required for assembly.

Provision can be made for the on-load tap-changer to be oriented or arranged horizontally or vertically inside the tap-changing transformer.

Provision can be made for the on-load tap-changer to be arranged next to and/or above and/or below an active part inside the tap-changing transformer.

The tap-changing transformer can be designed in any way and can be designed, for example, as a single-phase or multi-phase distribution transformer and/or pylon transformer and/or service transformer and/or pad-mounted transformer and/or pole-mounted transformer. This tap-changing transformer can preferably be used for voltages of up to 36 kV.

FIG. 1 shows an on-load tap-changer 1 for uninterrupted diverter switch operation between different winding taps 31 of a tap-changing transformer 30. The on-load tap-changer 1 is arranged on the inside horizontally above the active part 32 of the tap-changing transformer 30 and protrudes laterally from the housing 6 of the tap-changing transformer 30. As an alternative, the on-load tap-changer 1 can be arranged vertically, in which case it then protrudes from the housing 6 or the cover 7 at the top. The on-load tap-changer 1 is connected to the respective winding taps 31 of the active part 32 via lines.

The tap-changing transformer 30 is a single-phase or multi-phase distribution transformer which can be designed, in particular, as what is called a pylon transformer, service transformer, pad-mounted transformer or pole-mounted transformer. This tap-changing transformer is preferably used for voltages of up to 36 kV.

Figure 2:
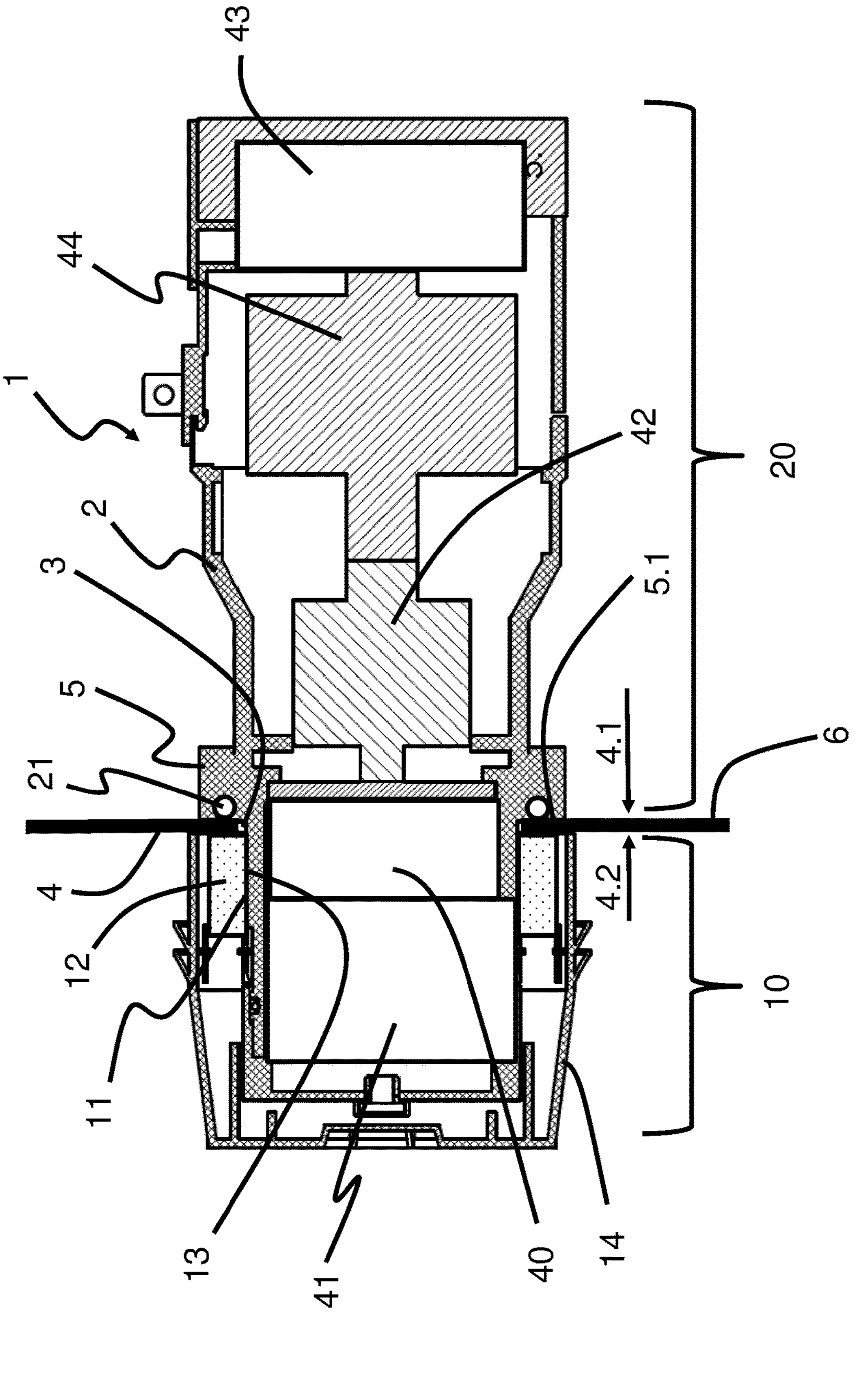
FIG. 2 shows a sectional view of the on-load tap-changer.

FIG. 2 shows a detailed sectional view of the on-load tap-changer 1 for uninterrupted diverter switch operation between different winding taps 31 of a tap-changing transformer 30. The on-load tap-changer 1 has a flange module 2 which is divided substantially into two regions. The first region 10 is separated from the second region 20 by a wall 4. After the on-load tap-changer 1 has been assembled, the first region 10 of the on-load tap-changer 1 is located outside the tap-changing transformer 30. The second region 20 of the on-load tap-changer 1 is located inside the tap-changing transformer 30.

When assembling the on-load tap-changer 1, the flange module 2 of the on-load tap-changer 1 is inserted through an opening 3 of the housing 6, here a wall 4 of the tap-changing transformer 30. This is possible because the flange module 2 and therefore the on-load tap-changer 1 have a relatively small or approximately the same diameter as the diameter of the opening 3 in the wall 4 of the tap-changing transformer 30 in the first region 10.

The flange module 2 has a flange 5, the diameter of which is larger than the diameter of the opening 3. The flange module 2 can protrude substantially only up to this flange 5 through the opening 3 of the wall 4. The flange 5 has a first face 5.1 which points to the inner side 4.1 of the wall 4 or housing 6. One or more seals in the form of one or more sealing rings 21 can be arranged between the first face 5.1 and the inner side 4.1 of the wall 4 when the on-load tap-changer 1 is in the assembled state. The seal or sealing ring 21 is therefore arranged between the flange module 2 and the housing 6. This prevents transformer oil that is inside the tap-changing transformer 30 from escaping.

The first region 10 of the flange module 2, which is arranged on the outer side 4.2 of the tap-changing transformer 30, has an at least partially formed thread 11 running on the circumference. The on-load tap-changer 1 is fastened to the housing 6 of the tap-changing transformer 30 by means of a union nut 12 which has an internal thread 13. By tightening the union nut 12, the flange module 2 and therefore the entire on-load tap-changer 1 is pressed against the inner side 4.1 of the housing 6 or the wall 4. The connection between the union nut 12 and the flange module 2 can also be implemented by means of locking lugs or the like. The union nut 12 is placed on the flange module 2 in order to fix it. The flange module 2 is supported on the inner side of the wall 4 of the tap-changing transformer 30 via the flange 5. In the embodiment shown here, a covering cap 14 is clipped onto the on-load tap-changer from the outside. This serves as protection against the weather.

The flange module 2 forms part of the on-load tap-changer 1. The control unit (controller) 40 and the communication unit 41 are arranged in the first region 10 of the flange module 2. These are accessible from the outside, that is to say outside the tap-changing transformer 30. The drive 42, the diverter switch 43 and the selector 44 are arranged in the second region 20 which is located inside the tap-changing transformer 30. While the selector 44 is made up of mechanical switches/contacts, the diverter switch 43 has semiconductor switching elements. The on-load tap-changer 1 is therefore what is called a hybrid on-load tap-changer.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 On-load tap-changer
2 Flange module
3 Opening
4 Wall
4.1 Inner side of 4
4.2 Outer side of 4
5 Flange
5.1 First face of 5
6 Housing
7 Cover
10 First region
11 Thread
12 Union nut
13 Internal thread
14 Covering cap
20 Second region
21 Seal or sealing ring
30 Tap-changing transformer
31 Winding taps
32 Active part
40 Control unit
41 Communication unit
42 Drive
43 Diverter switch
44 Selector

The invention claimed is:

1. An on-load tap-changer for uninterrupted diverter switch operation between different winding taps of a tap-changing transformer, the on-load tap-changer comprising:
- a flange module;
- a union nut;
- a controller or a communication unit arranged in a first region of the flange module; and
- a drive, a diverter switch, and a selector arranged in a second region of the flange module;
- wherein the first region of the flange module is arranged at least partially outside the tap-changing transformer,
- wherein the second region of the flange module is arranged at least partially inside the tap-changing transformer, and
- wherein the on-load tap-changer is configured to be fastened to the tap-changing transformer by the union nut and the flange module.

2. The on-load tap-changer as claimed in claim 1, wherein:
- the flange module comprises a flange;
- the union nut is configured to press the flange against a housing of the tap-changing transformer and thereby secure the on-load tap-changer by attaching the union nut to the flange module in a condition where the on-load tap-changer is in an assembled state.

3. The on-load tap-changer as claimed in claim 2, wherein:
- the flange module further comprises an at least partially formed thread running on a circumference in a first region,
- the union nut comprises an internal thread;
- the union nut is configured to press the flange against an inner side of the housing of the tap-changing transformer and thereby secure the on-load tap-changer by attaching the union nut to the flange module in the condition where the on-load tap-changer is in the assembled state.

4. The on-load tap-changer as claimed in claim 2, further comprising at least one seal that is configured to be arranged between the flange module and the housing in the condition where the on-load tap-changer is in the assembled state.

5. A tap-changing transformer, the tap-changing transformer comprising:
- an on-load tap-changer configured for uninterrupted diverter switch operation between different winding taps of the tap-changing transformer, the on-load tap-changer comprising:
  - a flange module comprising a flange;
  - a union nut;
  - a controller or a communication unit arranged in a first region of the flange module; and
  - a drive, a diverter switch, and a selector arranged in a second region of the flange module;
- a housing; and
- an active part comprising the winding taps,
- wherein the on-load tap-changer is arranged above or next to the active part,
- wherein the first region of the flange module is arranged at least partially outside the tap-changing transformer,
- wherein the second region of the flange module is arranged at least partially inside the tap-changing transformer, and
- wherein the on-load tap-changer is configured to be fastened to the tap-changing transformer by the union nut and the flange module.

6. The tap-changing transformer as claimed in claim 5, wherein the on-load tap-changer is oriented horizontally or vertically.

7. The tap-changing transformer as claimed in claim 5 wherein the tap-changing transformer is a single-phase or multi-phase distribution transformer.

8. The tap-changing transformer as claimed in claim 5, wherein:
- the union nut presses the flange against the housing of the tap-changing transformer and thus secures the on-load tap-changer by attaching the union nut to the flange module.

9. The tap-changing transformer as claimed in claim 8, wherein:
- the flange module further comprises an at least partially formed thread running on a circumference in a first region,
- the union nut comprises an internal thread; and
- the union nut presses the flange against an inner side of the housing of the tap-changing transformer and thus secures the on-load tap-changer by attaching the union nut to the flange module.

10. The tap-changing transformer as claimed in claim 5, further comprising at least one seal that arranged between the flange module and the housing.

11. The on-load tap changer as claimed in claim 1, wherein the diverter switch has semiconductor switching elements and the selector has mechanical switches.

12. The tap-changing transformer as claimed in claim 5, wherein the diverter switch has semiconductor switching elements and the selector has mechanical switches.

* * * * *